United States Patent [19]

O'Rourke

[11] Patent Number: 4,652,000
[45] Date of Patent: Mar. 24, 1987

[54] SEALING SYSTEM FOR HIGH PRESSURE GAS APPLICATIONS

[75] Inventor: Glenn R. O'Rourke, Sterling Heights, Mich.

[73] Assignee: Ex-Cell-O Corporation, Troy, Mich.

[21] Appl. No.: 887,475

[22] Filed: Jul. 21, 1986

[51] Int. Cl.[4] .................. F16J 15/56; B60G 11/26
[52] U.S. Cl. ........................... 277/73; 277/103; 277/170; 280/705
[58] Field of Search .............. 277/12, 32, 73, 103, 277/165, 170-172, 174; 280/705, 702, 709

[56] References Cited

U.S. PATENT DOCUMENTS

| | | | |
|---|---|---|---|
| 3,004,783 | 10/1961 | Webb | 277/103 |
| 3,129,948 | 4/1964 | Kendall | 277/103 X |
| 4,106,779 | 8/1978 | Zabcik | 277/73 X |
| 4,386,782 | 6/1983 | Reverberi | 277/73 X |
| 4,447,073 | 5/1984 | Brandstadter | 280/705 |
| 4,537,422 | 8/1985 | O'Rourke | 280/705 |

FOREIGN PATENT DOCUMENTS

| | | | |
|---|---|---|---|
| 340378 | 1/1931 | United Kingdom | 277/73 |
| 929569 | 6/1963 | United Kingdom | 277/103 |

Primary Examiner—Robert S. Ward
Attorney, Agent, or Firm—John C. Evans

[57] ABSTRACT

A high pressure sealing system is disposed between a housing and a reciprocating member. One version has a reciprocating plunger and in another version is a reciprocating piston associated with a free floating piston. In the one embodiment, the reciprocating plunger is directed through a housing that includes spaced spring biased seal assemblies each including a wedge member that is spring biased against a continuously circumferentially formed seal ring having an inner radial seal surface sealing the reciprocating plunger and an axial seal surface that in one case is sealed against the housing and in another case is sealed with respect to an intermediate seal carrier with a cavity defining a buffer space and which carries two static o-ring seal members for sealing against the housing and another seal ring that has an inside radial seal surface in engagement with the piston and an axial surface in sealing engagement with a cylinder; each seal ring a convoluted surface to prevent it from pinching between the relatively reciprocating member and housing. The piston in the other embodiment is further associated with a floating piston having an oil cavity on one side thereof and a gas chamber on the other side thereof and the floating piston carries a pair of spaced seal assemblies each including a spring biased wedge and a continuous annular seal ring of the type previously described that seals with respect to a seal support rib on the floating piston and a housing member that surrounds the floating piston.

4 Claims, 6 Drawing Figures

SEALING SYSTEM FOR HIGH PRESSURE GAS APPLICATIONS

FIELD OF THE INVENTION

This invention relates to sealing systems and more particularly to sealing systems for separating a high pressure gas source from an oil cavity and to do so by means of a combination of sealing components including spring biased continuous ring elements that accommodate lateral movement between the relatively reciprocating members that are to be sealed by the sealing components.

DESCRIPTION OF THE PRIOR ART

U.S. Pat. No. 4,537,422 discloses a high pressure sealing system for separating an oil reservoir from a high pressure gas source and, more particularly, does so by use of a plurality of spaced sealing elements having spring loaded dynamic sealing components and elements that are acted upon by the high pressure gas to seal between the reciprocating member and the housing of the seal assembly so as to prevent gas leakage.

U.S. Pat. No. 3,129,948 also includes a packing gland having spring biased dynamic seal components and spaced static seal components for sealing between a fluid filled chamber and the exterior of the packing gland.

It has also been proposed to use spring biased wedge members to bias a continuously formed annular member to seal both axially and radially with respect to relatively movable members for sealing therebetween.

The prior proposals, however, do not suggest a seal assembly in which wedge shaped spring biased members hold continuously formed annular seal rings with respect to a buffer defining seal support at one end of the seal assembly and a like wedge shaped member biasing a second annular continuously formed seal ring between relatively movable members that are sealed by the over all seal assembly.

Furthermore, the prior arrangements, while recognizing that the continuously formed seal ring can be pinched between the relatively movable members, fail to disclose an arrangement that will prevent such pinching action while retaining resistance to seal twisting during operation of the seal assembly.

STATEMENT OF INVENTION AND ADVANTAGES

In accordance with the present invention a reciprocating plunger or piston rod is sealed with respect to a housing member by a seal assembly that includes a pair of spaced, spring biased seal assemblies each including a spring biased wedge member that seals a continuously circumferentially formed seal member with respect to relatively fixed and relatively movable members that are engaged by the seal member and, more particularly, such wedge members for biasing one of the seal members between a relatively movable member and a static buffer forming member and biasing the other of the seal members between the relatively movable member and a fixed housing member.

In another embodiment of the invention, the spaced spring biased seal assemblies are configured so that one of them includes a cup retainer that can be adjustably spaced on an end cap by shim means to locate a biasing spring with respect to a wedge configured member to spring bias a continuously formed member so as to locate a radial seal surface thereon in engagement with a movable member and an axial surface thereon in engagement with a static buffer member and wherein the radial and axial surfaces of the seal ring are joined by a right angle surface that prevents the continuously formed seal member from being pinched between the relatively movable members sealed by the seal assembly.

In another embodiment of the invention, the movable member that is sealed by the seal assembly is in the form of a piston and the spring biased wedge member component of the seal assembly is directed against a continuously formed annular seal that includes a radial seal surface and an axial seal surface joined by a convoluted surface that stabilizes the seal ring against twisting and furthermore reinforces the seal member so that the relative position of the radial and axial sealing surfaces thereon will be maintained when high pressure fluid pressure differences are imposed across the opposite surfaces of the seal element.

Another version of the invention includes such sealing components on a relatively reciprocating member in an oil filled chamber which is associated with a floating piston that closes one end of the oil chamber and separates the oil chamber from a high pressure gas cavity at the opposite end of a sealed housing.

These and other advantages of the present invention will be more apparent with reference to the following description and drawings of preferred embodiments of the invention and the accompanying drawings thereof.

DETAILED DESCRIPTION OF THE INVENTION

Figure 1:
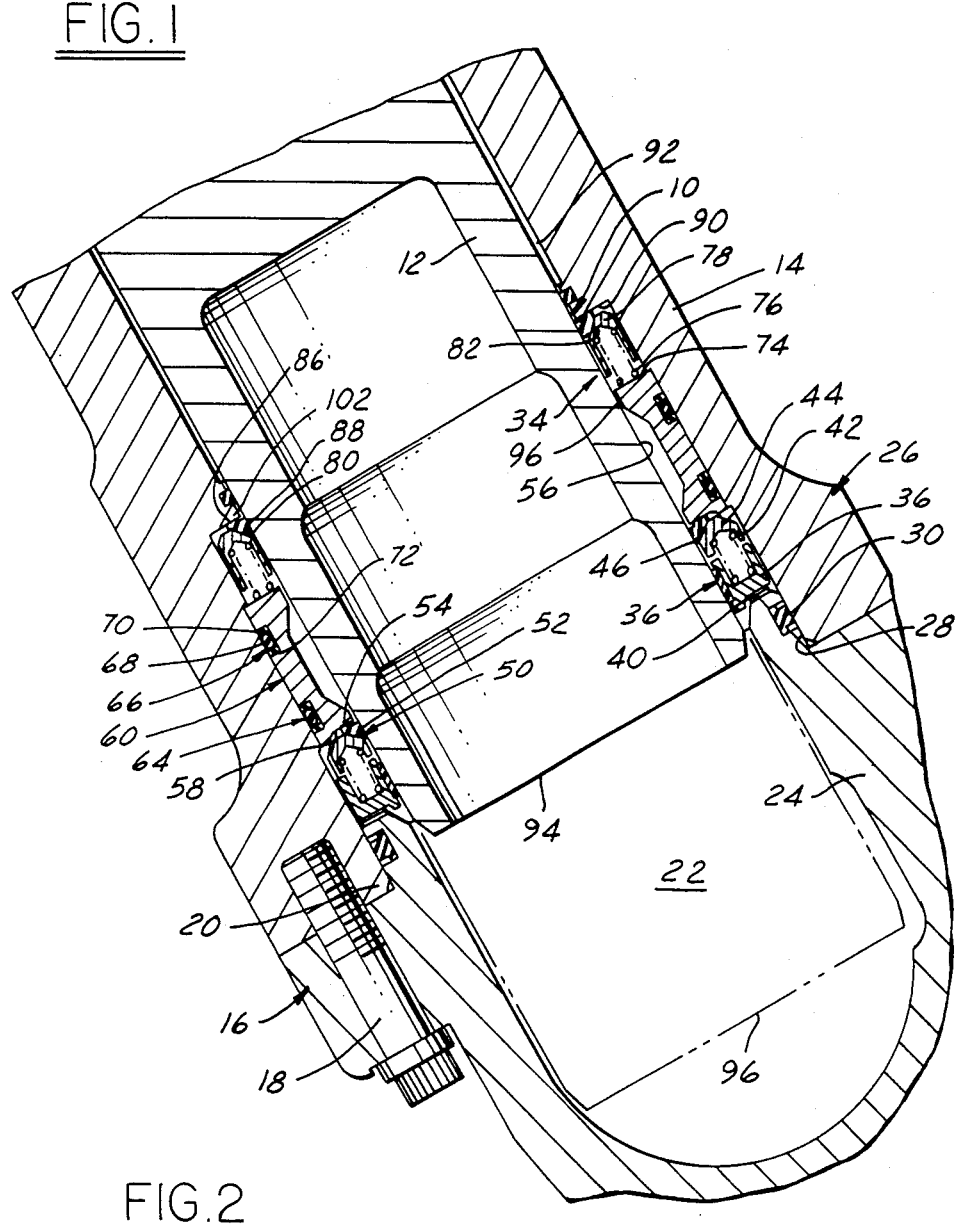
FIG. 1 is a sectional view of one embodiment of a high pressure seal assembly of the present invention.

Referring now to FIG. 1, a high pressure seal assembly 10 is illustrated of the type suitable for use in road wheel suspensions shown in U.S. Pat. No. 4,537,422. In FIG. 1, only the key operating components of the road wheel suspension 10 are illustrated. They are shown in association with a reciprocating rod 12 which corresponds to the reciprocating rod of the -422 patent. The reciprocating rod 12 is moved relative to a housing 14 which in the illustrated arrangement constitutes the lower end of a road wheel arm of a self-contained externally mounted hydromatic suspension unit. The housing 14 is closed at its lower end by a cylinder head 16 which is connected by suitable fasteners such as screws 18 to an open end 20 of the road arm housing 14. The cylinder head 16, as in the case of the self contained hydropneumatic suspension unit disclosed in U.S. Pat. No. 4,537,422, defines a cavity 22 which is filled with oil. The cavity 22 communicates through a passage 24 to a single chamber gas spring 26 which is also described in the -422 patent.

The cylinder head 16 is inserted into a bore 28 of the road arm housing. It includes an annular seal ring 30 thereon that is in sealing engagement with the road arm housing 14 at the bore 28 for sealing between the housing 14 and the cylinder head 16.

In accordance with certain principles of the present invention, the seal system 10 includes a pair of spring biased seal assemblies 32, 34 that are located at spaced apart axial locations along the inside diameter of the housing 14 as best seen in FIG. 1. The spring biased seal assembly 32 includes a cup shaped retainer 36 that is supported by shims 38 on the end surface 40 of the cylinder head 16. The cup shaped retainer 36 supports a spring 42 which biases a wedge element 44 upwardly into the housing 14 so as to cause an inclined annular surface 46 thereon to act against the complementary inclined surface 48 of the seal ring 50.

Figure 5:
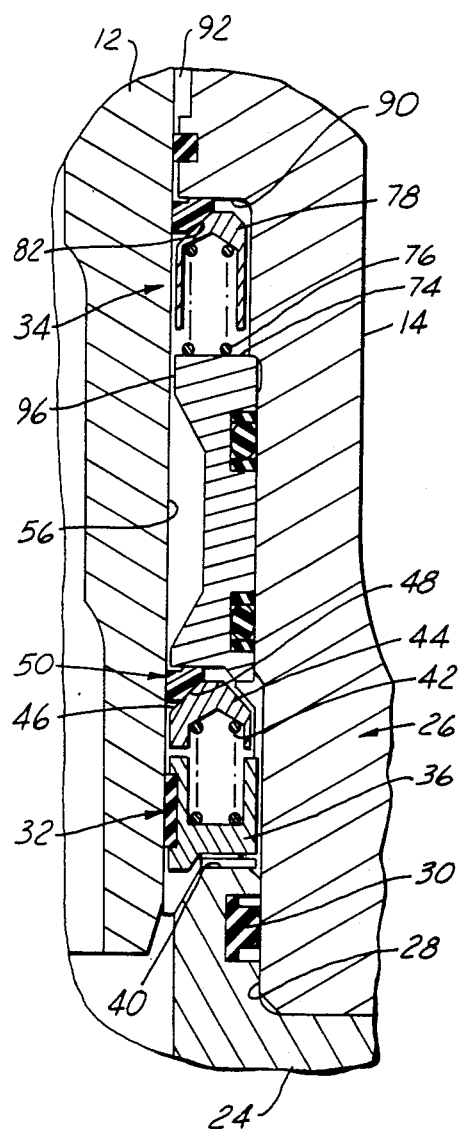
FIG. 5 is an enlarged fragmentary sectional view of the seal assembly in FIG. 1.

As shown in FIGS. 1 and 5, the seal ring 50 is configured to have a radial surface 52 and an axial surface 54. The radial surface 52 is in sliding sealing engagement with the outer surface 56 of the piston rod 12 and the axial surface 54 is biased against the outboard end of a seal retainer 60. The seal retainer 60 has a cavity 62 formed in the i.d. thereof that defines a buffer space. The buffer space separates the dynamic seal assembly 34 from large pressure excursions in the gas spring. The pressure attenuation of the buffer space is due to the bulk modulus of the oil in the cavity and the leakage rate of the cavity as compared to that of seal assembly 32. The retainer 60 also carries on its outer periphery a pair of spaced annular seals 64, 66. Each of the seals includes an o-ring 68 and a pair of flat seal rings 70, 72.

The inboard end 74 of the seal retainer 60 is in engagement with a spring 76 in the spring biased seal assembly 34. The spring 76 biases a cup shaped retainer 78 into the unit so as to force an inclined surface 80 thereon against a complementary inclined surface 82 of the seal 84. The seal ring 84 is formed as a continuously circumferentially uninterrupted member having an axial surface 86 and a radial surface 88 thereon that respectively engage an under cut surface 90 on the housing 14 and a spaced segment on the outer surface 56 of the piston rod 12.

By virtue of the aforesaid arrangement, the upper region 92 that is filled with oil is sealed with respect to the gas in the gas spring 26 even though the stroking of the piston rod 12 between a static position shown at 94 and a jounce position shown at 96 can cause a differential pressure condition within the cavity 22 in the order of 10,000 p.s.i. The capability to seal such differential pressures is attributable to the fact that the seal retainer 60 has clearances 96, 98 with respect to the outer surface 56. Consequently, the piston rod 12 is able to be displaced small lateral distances without affecting the integrity of the annular seals 64, 66. At the same time, the seal rings 50, 84 are shifted to accommodate such displacement but nevertheless retain a full running contact between the surface 56 and the radial surfaces 52, 88 while retaining sealing engagement between the axial surfaces 54 and 86 at their sealing contact with the seal retainer 60 and the housing 14 respectively.

Figure 2:
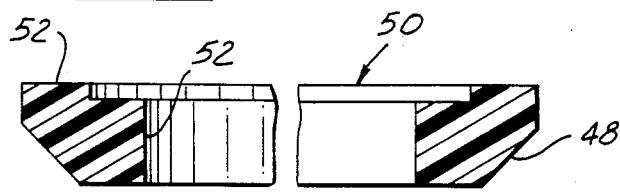
FIG. 2 is an enlarged sectional view of a seal member used in the embodiment of FIG. 1.

A further feature is that each of the seal rings 50, 84 include a right angle under cut 100 therein that is, as shown in FIG. 2, dimensioned to clear an adjacent edge portion 102 on the housing 14 so that lateral adjustment of the seal rings will be accomplished without the seal rings being trapped between the relatively movable sealed members.

Figure 3:
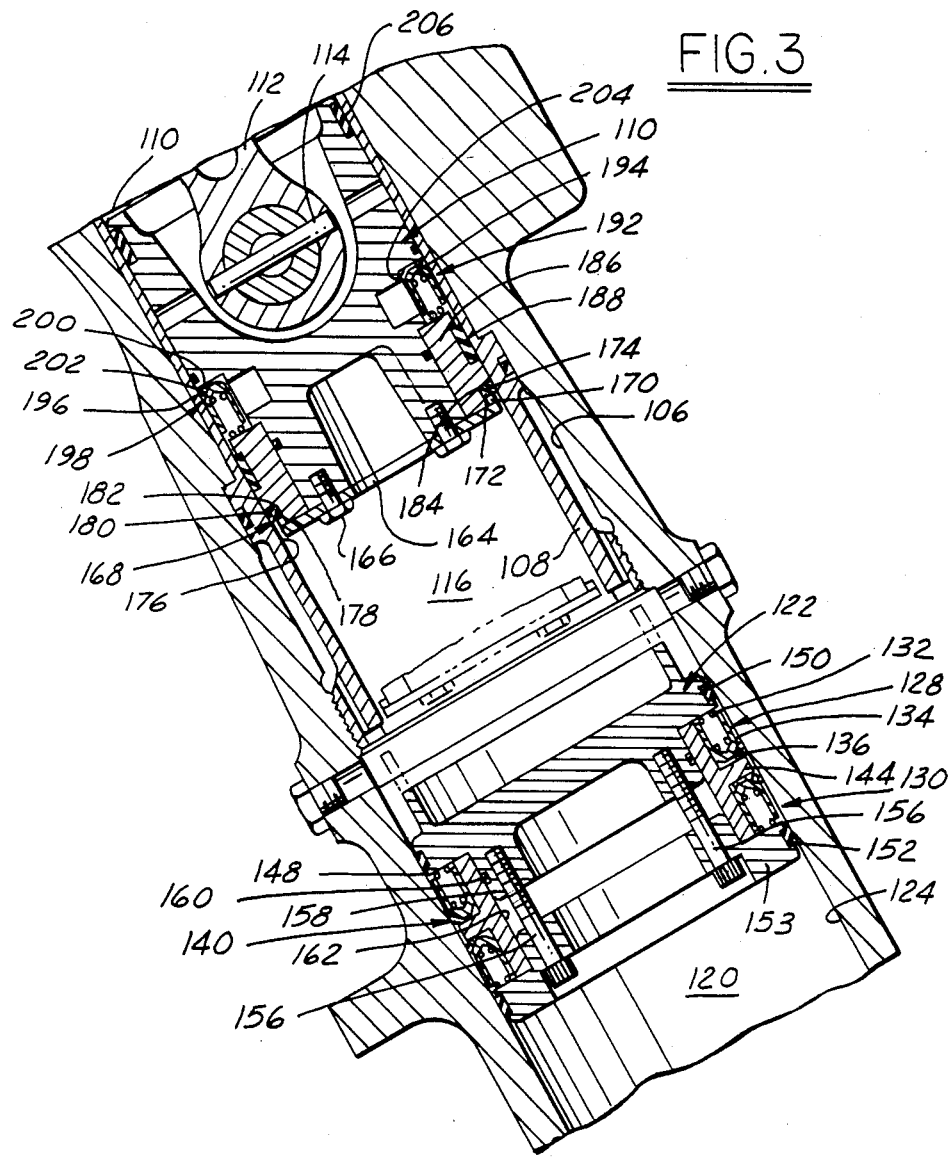
FIG. 3 is a sectional view of another embodiment of a high pressure seal assembly in accordance with the present invention.
Figure 4:
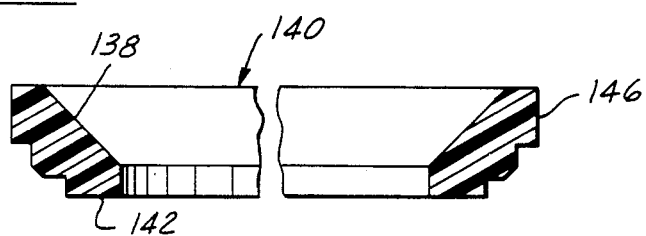
FIG. 4 is an enlarged sectional view of a seal member used in the embodiment of FIG. 3.
Figure 6:
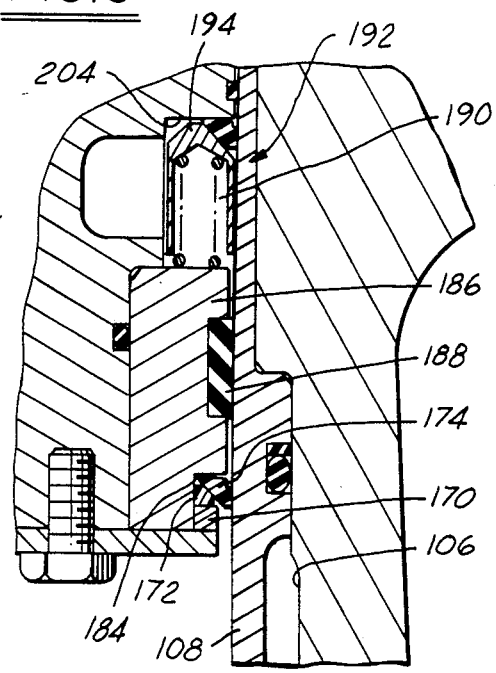
FIG. 6 is an enlarged fragmentary sectional view of a seal assembly in FIG. 3.

Referring now to the embodiment of the invention shown in FIGS. 3, 4 and 6 a housing 104 is illustrated. It includes a bore 106 in which is supported a cylinder sleeve 108 for a reciprocating piston 110 that is connected to a connecting rod 112 by means of a cross pin 114. The connecting rod 112 can be operated by a number of operating devices, for example by a rotatable spindle of the type set forth in U.S. Pat. No. 4,447,073. The piston 110 is reciprocated within the sleeve 108 and separates a high pressure oil chamber 116 from an oil reservoir 118. The high pressure oil chamber 116 is separated from a high pressure gas spring cavity 120 by a floating piston 122 that is slidingly supported within an extension 124 of the bore 106.

The floating piston 122, in accordance with certain principles of the present invention, carries an annular seal retainer 126 for a pair of spaced spring biased seal assemblies 128, 130. Each of the seal assemblies 128, 130 include a biasing spring 132 and a cup shaped retainer 134. The cup shaped retainer 134 includes an inclined surface 136 thereon in engagement with a complementary inclined surface 138 of a seal ring 140. In this embodiment, the seal ring 140 includes an axial surface 142 that is in engagement with a seal rib 144 that is formed on the seal retainer 126 at an intermediate point thereon as best shown in FIG. 3. A radial surface 146 on each of the seal rings 140 is located in sealing engagement with the bore extension 124. The piston o.d. 148 is spaced from the extension 124 by a pair of spaced glide rings 150, 152 that engage the extension 124 of the bore 106 to provide a pair of end seals on the floating piston 122 to reduce the pressure imposed on the seal rings 140 as they are reciprocated on the extension 124 in response to stroking of the piston 110. The seal rings 140, as in the case of the rings in the first embodiment, are free to shift laterally and continue to define a good sealing contact of the radial surfaces 146 with respect to the housing 104 thereby to assure a positive seal of the gas within the high pressure spring cavity 120.

In the illustrated arrangement, the seal retainer 126 is held in place by a retainer cover 153 secured to an inboard piston component 154 by means of screw fasteners 156. The piston component 154 has a small diameter end 158 thereon which carries an annular seal 160 that seals against the inside diameter 162 of the retainer 126.

The pressure excursions in the oil chamber 116 are sealed at the piston assembly 110 by a unique high pressure seal system including a retainer plate 164 on the end of the piston 110 which is held in place by screws 166 so as to hold an outboard seal assembly 168 in place. The seal assembly 168 includes a ring element 170 that carries an o-ring 172 that biases a seal ring 174 into sliding sealing contact with the interior surface 176 of the sleeve 108. The seal ring 174 includes an inclined surface 178 that receives the biasing action of the o-ring 172 to cause a radial surface 180 on the ring 174 to be maintained in good sealing contact with the sleeve surface 176 while at the same time directing an axial surface 182 on the ring seal against the under cut surface 184 of a sliding seal carriage 186. The sliding seal carriage 186 has a glide ring 188 supported therein which has an extended axial annular sealing surface thereon that supports the carriage 186 in spaced relationship to the sealing surface 176 of the sleeve 108. The carriage 186 also supports a spring 190 of a spring biased seal assembly 192 like those used in the floating piston 122. The spring biased seal assembly 192 more particularly includes a wedge shaped element 194 that includes an inclined surface 196 thereon that will direct the spring action against a ring seal 198 having both an axial surface 200 and a radial surface 202 to seal against the surface 176 and the body portion 204 of the piston 110. The piston also includes a glide ring 206 on the opposite end thereof also configured to space the o.d. of the piston 110 with respect to the sleeve 108 so that slight lateral shifting of the piston 110 can be accommodated without disturbing the sealing relationship of the dynamic sealing surfaces of the assembly in this embodiment.

Referring to the ring seals 198 of this embodiment, they are configured to have a two step surface configuration 208, 210 that are spaced with respect to corner edges of the adjacent sealed members so as to prevent the ring seals from being undesirably trapped between the relatively movable sealed members. Furthermore, the two step surfaces 210, 212 serve to prevent undesirable twisting of the seals during reciprocation thereof with respect to the fixed sealed surfaces of the assembly.

While the embodiments of the present invention as herein disclosed constitute preferred forms, it is to be understood that other forms might be adopted.

The embodiments of the invention in which an exclusive property of privilege is claimed are defined as follows:

1. A high pressure seal assembly comprising a reciprocating member and a static support means, said static support means supporting a pair of axially spaced spring biased seal means, each of said seal means including a movable member including an inclined surface thereon for directing a spring force in a radial and in an axial direction; an annular ring seal element including a surface thereon complementary to said inclined surface and in engagement therewith, said ring seal further including a radial surface and an axial surface thereon joined by a right angle cut-out segment, said right angle cut-out segment being configured to clear said reciprocating member and said static support means so as to prevent trapping of said ring seal therebetween, each of said radial surfaces being slidably sealingly engaged with the outer surface of the reciprocating member and means for supportingly sealing the axial surfaces with respect to the static member for sealing therebetween.

2. In the combination of claim 1, a housing, said static support means including a cavity forming seal retainer means having a pair of spaced static seals therein; one of said ring seals having an undercut thereon to clear abutment surfaces on said cavity forming seal member; the other of said ring seals including an undercut surface thereon to clear the abutment surfaces of the housing thereby to permit free lateral shifting movement of the ring seals with respect to the housing and the reciprocating member during relative movement between the reciprocating member and the static support means.

3. A high pressure sealing assembly for separating an oil reservoir from a high pressure gas cavity comprising a housing having a bore therein, a floating piston in said bore separating said cavity from said oil chamber; said floating piston including a seal flange and a pair of axially spaced spring biased seal means each including a spring biased member having an inclined surface thereon for directing a spring force in a radial and an axial direction; and seal means having axial and radial surfaces thereon; the radial surfaces forming a seal between the outer diameter of the floating piston and the bore of said housing and the axial surface of said ring seal engaging said seal flange within said floating piston; and a mechanically reciprocated piston located in said bore in spaced relationship to said floating piston for reciprocation with respect to said bore; said reciprocating piston including an outboard seal means thereon including spring biasing means and means for directing the spring force of the spring biasing means against an inclined surface of a seal element; an annular seal element having an inclined surface engaged with said spring biasing means including an axial surface and a radial surface thereon movable with respect to said reciprocating piston and its bore for compensating for slight lateral movement therebetween; said mechanically reciprocated piston further including a pair of spaced apart glide rings; one of said glide rings being located on the inboard end of said reciprocating piston and the other of said glide rings being located inboard of said outboard seal means on said mechanically reciprocated piston; and a second spring biased seal means carried by said mechanically reciprocated piston at a point thereon intermediate said glide rings; said second spring biased wedge means including means for directing the spring force both axially and radially and a second annular seal element including an inclined surface thereon engageable with said wedge means; said second seal element including axial and radial surfaces thereon engaged respectively with the bore of said reciprocating piston and said reciprocated piston and relatively laterally movable with respect to said reciprocated piston.

4. In the combination of claim 3, at least one of said annular seal elements having said axial and radial surfaces thereon further including a pair of stepped surfaces intermediate and joining said axial and radial surfaces to form a relief space for movement of said seal element with respect to adjacent seal engaged surfaces and to further reinforce said seal element against twisting along the circumference thereof during reciprocation of either or both of the floating piston and reciprocating piston components in the combination.

* * * * *